United States Patent
Kleibaumhüter et al.

(10) Patent No.: US 8,253,361 B2
(45) Date of Patent: Aug. 28, 2012

(54) DEVICE FOR THE CONTROLLED POWER CONSUMPTION OF ELECTRIC DRIVES IN MACHINERY AND MACHINE INCLUDING THE DEVICE FOR PROCESSING PRINTING MATERIAL

(75) Inventors: Klaus-Dieter Kleibaumhüter, Bad Schönborn (DE); Jürgen Kunz, Leimen (DE); Helmut Meyer, Wiesloch (DE); Josef Reiter, Eppelheim (DE); Andreas Schulz, Heidelberg (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 1448 days.

(21) Appl. No.: 11/825,950

(22) Filed: Jul. 10, 2007

(65) Prior Publication Data

US 2008/0009979 A1    Jan. 10, 2008

(30) Foreign Application Priority Data

Jul. 10, 2006 (DE) .................. 10 2006 031 796

(51) Int. Cl.
*H02P 27/06* (2006.01)
(52) U.S. Cl. ................ 318/400.31; 318/400.3; 700/291; 700/297; 307/64
(58) Field of Classification Search ............... 318/400.3, 318/400.31, 800; 700/286, 291, 295, 297; 307/64, 67, 68, 71
See application file for complete search history.

(56) References Cited

U.S. PATENT DOCUMENTS

| | | | |
|---|---|---|---|
| 4,117,537 A * | 9/1978 | Muench ........................ 700/295 |
| 4,349,879 A * | 9/1982 | Peddie et al. .................. 700/295 |
| 4,509,128 A * | 4/1985 | Coppola et al. ................ 702/61 |
| 4,535,280 A | 8/1985 | Harvest et al. |
| 5,747,973 A * | 5/1998 | Robitaille et al. ............. 323/239 |
| 5,762,973 A | 6/1998 | Holzschuh |
| 7,360,100 B2 * | 4/2008 | Allred et al. ................... 713/300 |
| 7,571,683 B2 * | 8/2009 | Kumar ............................ 105/35 |
| 2005/0052080 A1 * | 3/2005 | Maslov et al. ................ 307/10.1 |
| 2005/0120901 A1 | 6/2005 | Albrecht et al. |
| 2005/0184689 A1 * | 8/2005 | Maslov et al. ................ 318/254 |
| 2007/0005195 A1 * | 1/2007 | Pasquale et al. .............. 700/295 |
| 2008/0016940 A1 * | 1/2008 | Schmeink ........................ 72/435 |
| 2009/0157529 A1 * | 6/2009 | Ehlers et al. ..................... 705/26 |
| 2009/0177306 A1 * | 7/2009 | Bosga et al. ................... 700/103 |
| 2009/0222143 A1 * | 9/2009 | Kempton ....................... 700/291 |
| 2009/0326724 A1 * | 12/2009 | Lasseter et al. ............... 700/287 |
| 2010/0332061 A1 * | 12/2010 | Forslow et al. ................. 701/22 |
| 2011/0001361 A1 * | 1/2011 | Appel ............................ 307/64 |
| 2011/0015797 A1 * | 1/2011 | Gilstrap ........................ 700/291 |

FOREIGN PATENT DOCUMENTS

| | | |
|---|---|---|
| DE | 33 13 124 C1 | 7/1984 |
| DE | 33 16 761 A1 | 11/1984 |
| DE | 43 30 537 A1 | 3/1995 |
| DE | 44 21 914 A1 | 1/1996 |
| DE | 195 24 395 C1 | 10/1996 |
| DE | 101 53 920 B4 | 9/2004 |
| DE | 10 2004 041 468 A1 | 4/2005 |
| DE | 103 57 429 A1 | 7/2005 |
| DE | 10 2004 017 106 A1 | 10/2005 |
| GB | 2 281 825 A | 3/1995 |
| JP | 2060436 A | 2/1990 |
| JP | 02060436 A * | 2/1990 |
| WO | WO 2005/117248 A1 | 12/2005 |

* cited by examiner

*Primary Examiner* — Eduardo Colon Santana
(74) *Attorney, Agent, or Firm* — Laurence A. Greenberg; Werner H. Stemer; Ralph E. Locher

(57) ABSTRACT

A device for controlling electric drives in machinery includes an electronic control unit for calculating in advance the electric power required by the at least one electric drive as a function of motion profiles of the electric drive. A printing material processing machine having the drive, is also provided.

15 Claims, 3 Drawing Sheets

DEVICE FOR THE CONTROLLED POWER CONSUMPTION OF ELECTRIC DRIVES IN MACHINERY AND MACHINE INCLUDING THE DEVICE FOR PROCESSING PRINTING MATERIAL

CROSS-REFERENCE TO RELATED APPLICATION

This application claims the priority, under 35 U.S.C. §119, of German Patent Application DE 10 2006 031 796.3, filed Jul. 10, 2006; the prior application is herewith incorporated by reference in its entirety.

BACKGROUND OF THE INVENTION

Field of the Invention

The present invention relates to a device for controlling electric drives in machinery. The invention also relates to a machine, including the device, for processing printing material.

Production machinery with high-performance electric drives in the region of 100 KW and higher put a non-negligible strain on the alternating current supply system of the power supply industry. In particular, machinery having a load which fluctuates to a high degree put a lot of strain on the power supply system. The resultant peak loads must be compensated for by the power supply in an appropriate way, i.e. the power supply of the machine must be constructed to ensure the power supply even in the case of peak loads. In addition, those peak loads have a direct influence on the power rates charged by the power supplier because the peak loads create a need for expensive infrastructure in order to be able to meet those peak loads at all times. In particular, companies with large machinery and the corresponding high degree of load fluctuation must pay a high electricity rate. However, the peak loads of large machinery do not only put a lot of strain on the power supply system, but also create a need for an appropriate dimensioning of the power supply in the machine itself, because all components, such as power electronics systems and intermediate electric circuits, must be adapted to the peak load, even if the latter only occurs briefly. Printing presses, for example, have a plurality of electric drives that are supplied with power by a direct current voltage link circuit or DC circuit. If there are electric drives with high peak loads connected to the direct current voltage link circuit, the result is a correspondingly high peak load for the direct current voltage link circuit, i.e. the direct current voltage link circuit must be dimensioned to accommodate such a high peak load. That increases the cost for the dimensioning of the direct current voltage link circuit and the required DC voltage supply through a rectifier.

The problem of peak loads has basically been known for some time. Power management systems have been developed as a remedy. Such a power management system is known from German Published, Non-Prosecuted Patent Application DE 44 21 914 A1. The device described in German Published, Non-Prosecuted Patent Application DE 44 21 914 A1 especially applies to company power systems that are connected to the power supply system of a power supplier. The company power system supplies electric power to several machines and thus loads. The individual loads are controlled by what is referred to as a power conditioner. Such a device is used to avoid effective power peaks by taking power from the system of the power supplier during times of low demand, for example at night when rates are low, and storing the power in an energy storage device. A suitable energy storage device is, for example, a flywheel energy storage system. When the load of the company power system exceeds a predetermined limit of the power supplier, the required power is no longer taken from the supplier's system but from the flywheel energy storage system. Thus any excessive load on the power supplier's system due to effective power peaks is avoided. In addition, a capacitor assembly is provided to compensate for idle power peaks. The device proposed in German Published, Non-Prosecuted Patent Application DE 44 21 914 A1, however, does not provide a solution to the problem that the power supply of loads 1 to n in the company power system must be dimensioned to accommodate peak loads. That dimensioning to accommodate peak loads makes the company power supply system and the power supply in the loads 1 to n more expensive.

SUMMARY OF THE INVENTION

It is accordingly an object of the invention to provide a device for the controlled power consumption of electric drives in machinery and a machine, including the device, for processing printing material, which overcome the hereinafore-mentioned disadvantages of the heretofore-known devices and machines of this general type in such a way that power supply devices in machinery may be dimensioned for average power demand.

With the foregoing and other objects in view there is provided, in accordance with the invention, a device for controlling electric drives in machinery. The device comprises an electronic control unit for calculating, in advance, electric energy required by at least one electric drive as a function of motion profiles of the at least one electric drive.

The present invention is especially suitable for use with large production machinery that have a power demand in the region of about 100 KW and more, which is a high load for a 400 Volt three-phase power system and takes the system to its capacity limit. Machinery of this type is used, for example, in the graphic industry, where sheet-fed printing presses and folding machines have drives of this power class. Since the machinery present in a print shop has to get by with the local power supply system, the operator of a printing press would appreciate it if his or her machinery had an unproblematic load behavior because he or she would then only have to take a few additional steps to adapt the power system of his or her print shop and would not have to pay the power suppliers' high special rates. If an oversizing of the power supply in a printing press could be avoided, production costs of the press could be lowered in a corresponding way. In accordance with the present invention, the device for controlling the power consumption of electric drives includes a power electronics system that calculates in advance the electric power required by the electric drive motor as a function of motion profiles of the electric drive. The peak loads that occur in electric drive motors are closely related to sequences of operation in the printing press. In the press, in particular if there are adjustment motors that operate periodically, there are certain sequences that occur periodically. Other electric drive motors are only required for certain adjustment operations, and the electric power they require depends on the scale of the adjustment. According to the present invention, the power electronics system is able to calculate in advance the electric power that will be needed as a function of the motion profiles of the electric drives in the machine so that for a certain period of time in the future the electric power that will be needed is known with a high degree of probability. The power electronics system then compares the power that will be needed for this period of time with an acceptable peak load limit. If this load limit is likely to be exceeded in the calculated period of time, an amount of electric power that is higher than the initial demand of the electric drive is taken from the power system and stored in an energy storage device. However, the amount of power higher than the initial demand that is taken from the power system is still lower than the acceptable peak load limit. Another option to charge the energy storage device and to absorb peak loads is to take out power before the electric motor is switched on. The stored electric power can be retrieved from the storage device when the power demand of the electric drive exceeds the peak load limit in order to meet temporary peak loads.

If all electric motors or at least all high-power electric motors of a machine are equipped with a device according to the invention, the device according to the invention is able to calculate in advance the electric power demand of an entire machine by calculating in advance the required electric power for corresponding motion profiles for each electric drive and submitting the calculated values to a higher-level or superordinate electronic control unit, which will then calculate the total power demand of all electric drives in the machine. The electronic control unit may be a separate control unit. Alternatively, one of the power electronics systems may be constructed to calculate the energy demand of all of the other drives in addition to the energy demand of the associated drive or at least to receive the calculated values of the other power electronics systems and calculate the total demand. A great advantage of the device according to the invention is that the total electric power supply of the machine, which generally includes a number of electric drives, may be configured to accommodate merely the maximum average power demand because peak loads only occur in the drive itself and no longer in the power supply of the machine itself. This maximum average power demand then represents the maximum peak load of the power system. It is usually far below the original maximum peak load.

In accordance with another feature of the invention, the power electronics system is constructed to calculate the average electric power required by the electric drive during a certain period of time. This certain period of time is expediently selected in such a way that it corresponds to the duration of sequences of motion of the electric drive. If a motion profile of the electric drive includes a motion that extends over a period of time $T_n$, the calculation interval for calculating the average electric power ought to correspond to this period of time $T_n$. Therefore, based on the motion profile, the power electronics system calculates the total required electric power for the period of time $T_n$. If this is divided by the period of time $T_n$, the result is the average electric power that is required. This required average electric power will then be taken out of the power supply system during or even at least partly before the motion profile is carried out and made available to the electric drive. Peak loads are covered by an appropriate energy storage device connected before the electric drive. For this purpose, an electric energy storage device, which may be a capacitor or a capacitor assembly, is provided between the voltage source and the electric drive. This electrical energy storage device absorbs the electric power that is not needed initially. The stored energy can then be retrieved by the electric motor during periods of peak load as the motion profile is carried out so that the peak loads are evened out.

In accordance with a further feature of the invention, the electric drive is supplied with electric power through a converter or inverter. In most cases, printing presses have electric drive motors that are supplied with power through a voltage controlled in a converter or inverter. This provides very precise and largely continuous control of the rotational speed of the electric drive motors. The converter converts the direct voltage present at its input into the alternating voltage controlled in accordance with the electronic system of the motor. The use of an inverter is advantageous because it allows not only a current flow from the DC voltage system to the electric drive, but also, for example during dynamic braking, a recovery of the power from the electric drive to the DC voltage system. In order to keep the loading of the power supply system of the machine as low as possible, the energy storage device is positioned directly in front or upstream of the converter or inverter of the electric drive. A great advantage of this is that the peak loads caused by the electric drive only occur in the drive itself and in the converter or inverter, while the total power supply system in front or upstream of the energy storage device is only loaded with the maximum average electric power of the electric drive. Due to the positioning of the energy storage device, the occurring peak loads are locally limited so that the remaining power supply system of the machine can be dimensioned in terms of the average required electrical power taken out of the system. In printing presses, a direct current intermediate voltage circuit or DC circuit generally supplies power to a number of electric drive motors. The power electronics system including the energy storage device, the converter or inverter, and the electric drive are connected to this direct current intermediate voltage circuit. Due to the device according to the invention, this direct current intermediate voltage circuit is only loaded with the maximum average demand of the connected electric drive motors.

Due to a higher-level or superordinate power electronics system, it is also possible to coordinate the power demand of the electric drive motors relative to each other to further reduce the maximum required average electric power in the direct current intermediate voltage circuit, for example by avoiding a simultaneous start-up of all of the electric drive motors connected to the direct current intermediate voltage circuit. For this purpose, the power electronics systems of the motors may communicate with each other either directly or through a computer, e.g. the machine control unit, to interchange their power calculations for the purpose of coordinating their power requirements. Electric drives of lower priority then will not be started when the maximum peak load in the direct current intermediate voltage circuit has been reached. In addition, it is possible to limit the power input of individual drives in order to reduce the total demand. The direct current intermediate voltage circuit may be connected to an AC voltage system through a rectifier. In printing presses, this connection to the power supply system is the connection of the machine to the 400 Volt three-phase power supply system. Due to the use of the device according to the invention, a relatively uniform power, in particular without any peak loads above the maximum average demand, is taken from the 400 Volt three-phase power supply system.

In accordance with an added feature of the invention, sensors are provided to determine the current and/or voltage of the motor in order to feed the motor current and/or the motor voltage to the power electronics system for the purpose of calculating the electric power demand of the motor. Thus the power electronics system can take into account actual values of the motor current and actual values of the motor voltage and consequently make adjustments if deviations from the pre-calculated values for the motor current and motor voltage occur. This is done to prevent the motor current and motor voltage from assuming values that would cause the average electric power to increase beyond the predetermined limit.

This is an important aspect because even for identical motion profiles, the electric power demand of drive motors is not constant over their entire useful life. For example, a motor may run more smoothly or become sluggish over time due to wear and may thus require more or less power. In addition, movable components may be blocked, which may increase the power input of the electric drive at least temporarily. All of these aspects can be taken into account due to the determination of the motor current and motor voltage by the power electronics system. In this manner, the power electronics system may switch off the electric drive, if necessary, or reduce its power input, if compensation for increased power input by the energy storage device is no longer possible. This is another way of preventing the electric drive from exceeding the maximum average power input.

In accordance with an additional feature of the invention, the power electronics system advantageously includes an electronic memory for storing motion profiles of the electric drive. Depending on the task of the electric drive in a printing press, the drive has typical motion profiles. In particular, in the feeder of a printing press, the electric drives operate in periodic cycles, with the power demand fluctuating considerably during a cycle. However, this fluctuation can be taken into account by the power electronics system if the motion profile is known. According to the invention, the periodic motion profile in the feeder is stored in a memory location of the power electronics system. As soon as the printing press is started, based on the machine speed selected by the operator and the stored motion profile, the power electronics system can calculate the required average electric power of the feeder drive motors and charge the energy storage device accordingly. The periodic peak loads occurring in the operation of the feeder will then be compensated for by the energy storage device and will not cause any loading of the direct current voltage link circuit of the printing press. Thus the invention is particularly suited for evening out peak loads in periodic motion profiles of an electric drive and for limiting the maximum peak load taken out of the supply system to the average demand during a cycle.

With the objects of the invention in view, there is concomitantly provided a machine for processing printing material. The machine comprises a device according to the invention.

Other features which are considered as characteristic for the invention are set forth in the appended claims.

Although the invention is illustrated and described herein as embodied in a device for the controlled power consumption of electric drives in machinery and a machine, including the device, for processing printing material, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
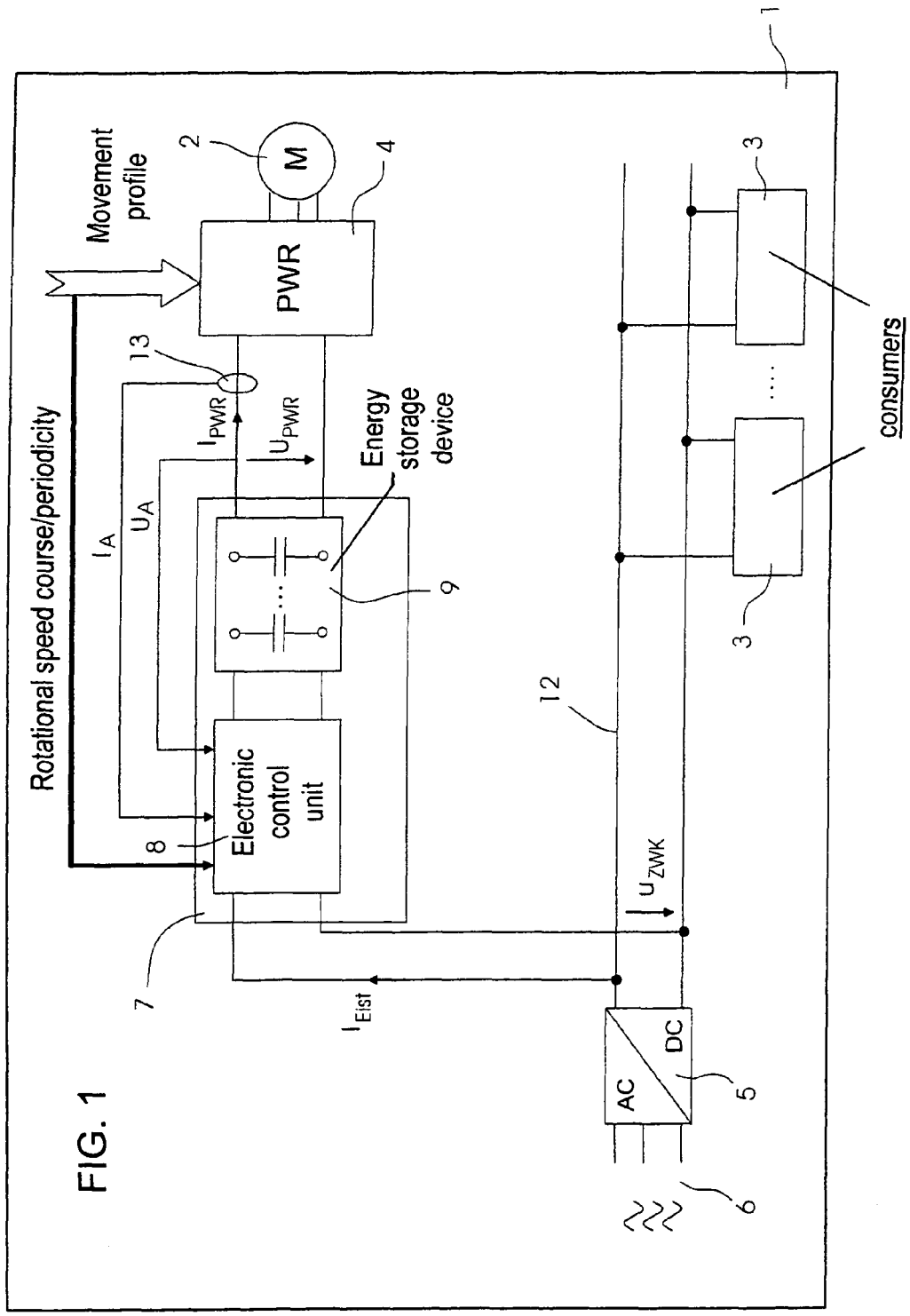
FIG. 1 is a block diagram showing a direct current voltage link circuit of a printing press with a device according to the invention for the power supply of an electric drive.

Referring now to the figures of the drawing in detail and first, particularly, to FIG. 1 thereof, there is seen a printing press 1 with a number of power consumers 3, one of which is illustrated in greater detail as an electric motor 2. The further direct current consumers 3 may also be electric motors. The direct current consumers 3 and the electric motor 2 are connected to a direct current voltage link circuit or DC circuit 12 of the printing press 1. This direct current voltage link circuit 12 is the highest power supply level of the printing press 1. A rectifier 5 connects the printing press 1 to a 400-Volt three-phase power supply system 6. The rectifier 5 ensures that a link circuit voltage $u_{ZWK}$ in the direct current voltage link circuit 12 remains as constant as possible. The electric motor 2 in FIG. 1 is electronically controlled and supplied with power through an inverter 4 for four-quadrant operation. The inverter 4 allows continuous adjustment of the rotational speed and torque of the electric motor 2. The invention itself is an energy management system 7, which is connected in front or upstream of the inverter 4 of the electric motor 2. This energy management system 7 connects the inverter 4 with the direct current voltage link circuit 12 and ensures that the electric motor 2 does not take more than a maximum acceptable electric power out of the direct current voltage link circuit 12. For this purpose, the energy management system 7 includes an electronic control unit 8, which is formed of a power electronics system and a computer that calculates the power demand of the electric motor 2. In addition, the energy management system 7 includes an energy storage device 9, which is formed of one or more capacitors. The purpose of the energy storage device 9 is to compensate for peak loads of the electric motor 2. Motion profiles of the electric motor 2 which may, for example, be used to drive a bar-type feeder or a sheet brake in a printing press 1, are stored in the electronic control unit 8. Both a bar-type feeder and a sheet brake have a motion profile with high periodic fluctuations. In addition, sensors 13 which are shown in FIG. 1 register a motor voltage $U_{PWR}$ and a motor current $I_{PWR}$ at the inverter 4 and transmit the detected values to the electronic control unit 8. Thus, the electronic control unit 8 can take into account the actual values $I_{PWR}$ of the motor current and $U_{PWR}$ of the motor voltage and initiate adjustments, if necessary. The direct current consumers 3, which are not illustrated in detail in FIG. 1, may generally be of the same structure as the electric motor 2, including the connected inverter 4 and energy management system 7. As a result, these direct current consumers 3 likewise take a maximum acceptable initial direct current $I_{Eist}$ out of the direct current voltage link circuit 12 and thus do not exceed a maximum acceptable average power. The great advantage of the present invention is that the direct current voltage link circuit 12 only needs to be configured to accommodate the maximum acceptable average power rather than peak powers. Peak powers may only occur in a locally limited way immediately at the electric motor 2, because they are compensated for by the energy management system 7, which is formed of the electronic control unit 8 and the energy storage device 9. As a result of this reduced dimensioning of the direct current voltage link circuit 12, the rectifier 5 may have smaller dimensions, because it does not have to cope with highly fluctuating peak powers, but only has to output a maximum acceptable average power. Another consequence is that the 400-Volt three-phase power supply system 6 is not subject to highly fluctuating powers and thus in particular to high peak loads.

Figure 1A:
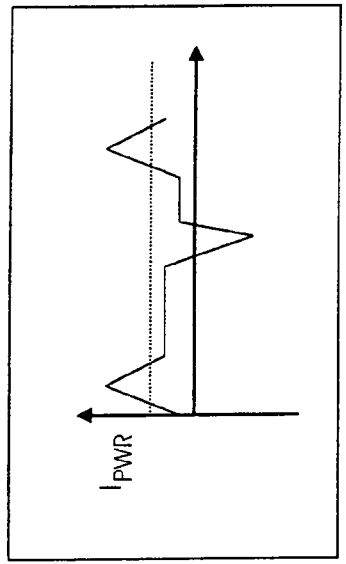
FIG. 1A is a graph showing the flow of power in the direct current voltage link circuit.
Figure 1B:
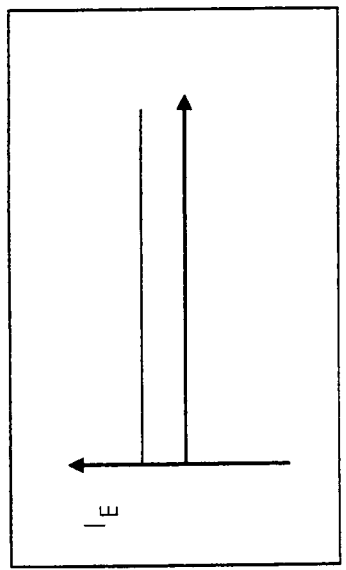
FIG. 1B is a graph showing the flow of power in the converter of the electric drive.

By way of example, FIG. 1A shows a calculated input current $I_E$, which corresponds to the actual input current $I_{Eist}$ of FIG. 1. As can be seen, in the ideal case, $I_E$ and $I_{Eist}$ remain constant over a certain period of time $T_n$ so that in the period of time $T_n$ no load fluctuations caused by the electric motor 2 occur in the direct current voltage link circuit 12. In contrast, FIG. 1B illustrates the motor current $I_{PWR}$ at the inverter 4, which exhibits high fluctuations corresponding to the motion profile of the electric motor 2. The current sequence of FIG. 1B illustrates both a motor operation and a generator operation of the electric motor 2. However, as a result of the energy management system 7, the required electric energy is calculated for a period of time $T_n$ and divided by the duration of the period of time $T_n$ to obtain the average required electric power and thus the average required input current $I_E$. The latter is constant over the duration of the period of time $T_n$ and corresponds to the average of the highly fluctuating motor current $I_{PWR}$.

Figure 2:
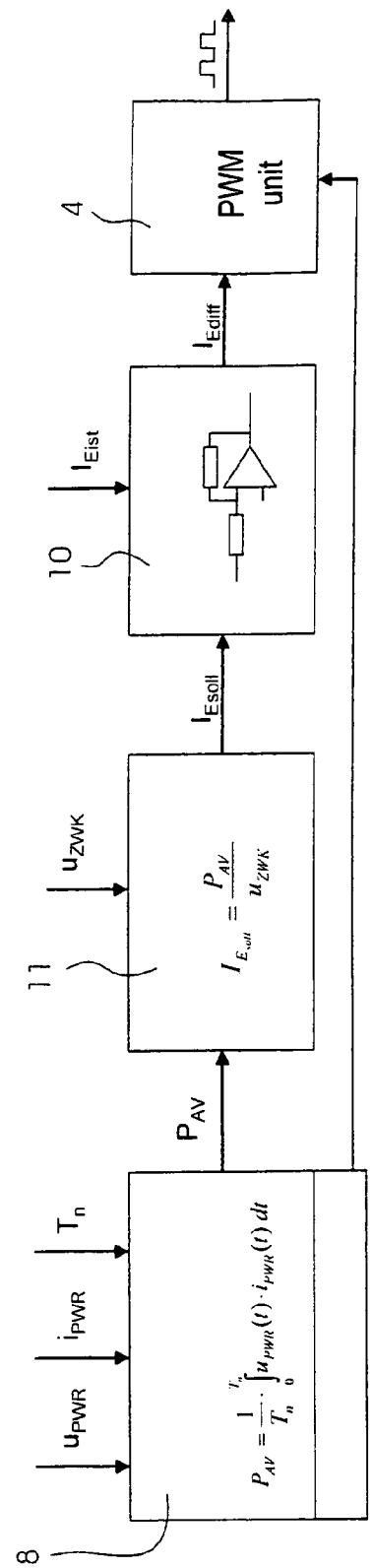
FIG. 2 is a flow diagram showing the sequence of calculating the average electric power.

FIG. 2 shows the sequence of calculating an average required electric power $P_{AV}$ of the electric motor 2. For this purpose, the electronic control unit 8 is supplied with the duration of the period $T_n$ of a repetitive motion and the associated profile from the stored motion profile and with actual values for the motor voltage $U_{PWR}$ and the motor current $I_{PWR}$, which are measured at the inverter 4. The electronic control unit 8 uses these data to calculate the required average electric power $P_{AV}$ for the duration of the predetermined interval $T_n$ by integration over the given interval $T_n$. A module 11 of the electronic control unit 8 for current calculation then calculates a setting motor current $I_{Esoll}$ from the calculated required average power $P_{AV}$ and the link circuit voltage $u_{ZWK}$ of the direct current voltage link circuit 12. In a current control 10, this setting value $I_{Esoll}$ is compared to the actual value $I_{Eist}$ of the input current of the energy management system 7. Occurring deviations $I_{Ediff}$ are compensated for by a difference current. In this manner, the calculated average electric power $P_{AV}$ is made available to the inverter 4. The electric energy that is not needed initially is stored in the energy storage device 9 so as to be available to the inverter 4 during peak loads. In this manner, peak loads are absorbed by the energy management system 7 rather than imposed on the direct current voltage link circuit 12.

The energy storage device 9 is constructed in accordance with the following aspects. Starting at the acceptable input voltage region $u_{PWR}$ of the inverter 4, the energy storage device 9 must be charged to the maximum acceptable voltage by the energy management system 7 at the beginning of the operation of the motor 2. The energy storage device 9 must be dimensioned in such a way that, once periodic peak powers have ended, the voltage at the energy storage device 9 does not fall below the lower voltage limit of the inverter 4. During periods of low loads or recovery, for example during braking of the electric motor 2, the energy management system 7 causes the energy storage device 9 to be charged with a constant power. This recharge current is ideally optimized in terms of the periodic peak loads of the drive motor 2, so that when the maximum charged voltage is attained in the energy storage device 9, the next acceleration of the electric motor 2 occurs.

Figure 3A:
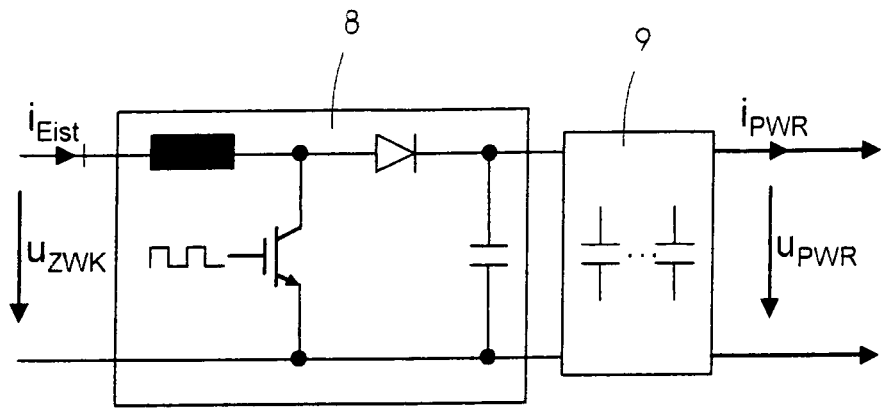
FIG. 3A is a schematic diagram showing a circuit according to the invention for constant power input exclusively for a motor operation motion profile of the drive motor.
Figure 3B:
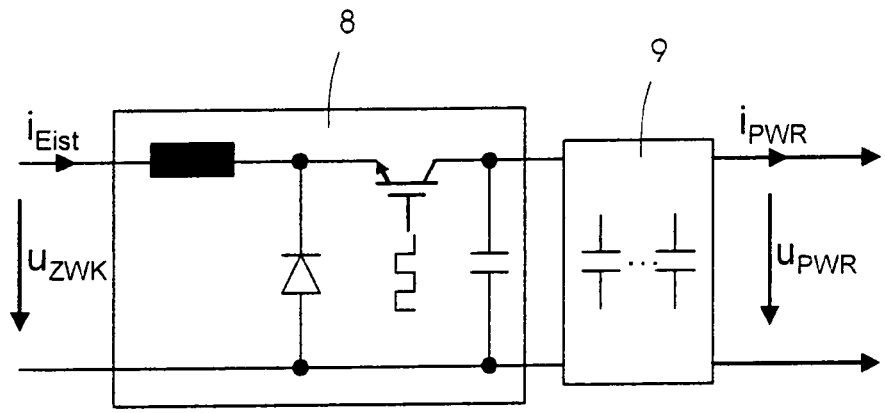
FIG. 3B is a schematic diagram showing a circuit according to the invention for constant power input exclusively for a generator operation motion profile of the drive motor.
Figure 3C:
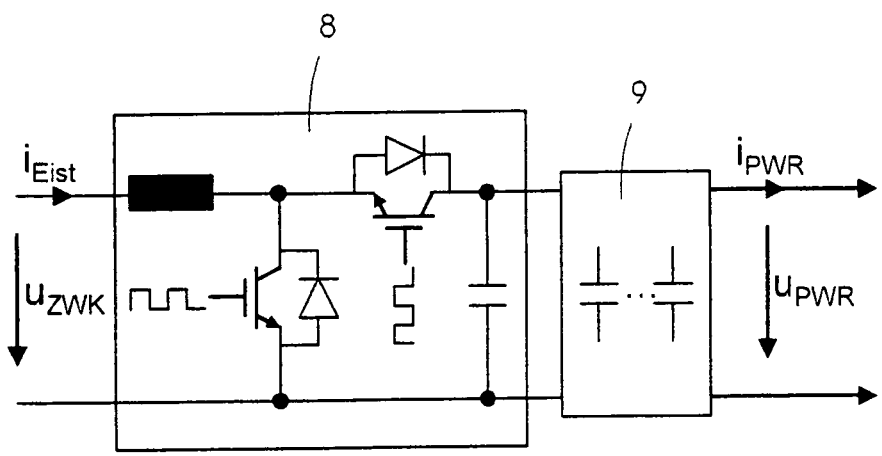
FIG. 3C is a schematic diagram showing a circuit according to the invention for constant power input for generator operation and motor operation motion profile of the drive motor.

FIG. 3A shows an electronic control unit 8 in connection with an energy storage device 9, which are constructed to even out motor operation peak loads of an electric motor 2. However, the circuit as shown in FIG. 3A does not allow energy recovery, so that it can only be used to compensate for motor operation peak loads. In this case, an inverter 4 allowing only motor operation is connected to the energy storage device 9. In contrast to this, the circuit as shown in FIG. 3B only allows generator operation of a connected electric motor 2 which, for example, continuously operates as a braking drive in a printing press 1. The electronic control unit 8 is used to reintroduce an average electric power that is as uniform as possible from the electric motor 2 through the energy storage device 9 into the direct current voltage link circuit 12. The electronic control unit 8, together with the energy storage device 9, ensures that no recovery peaks occur in the direct current link circuit 12 even during the recovery. FIG. 3C shows an electronic control unit 8 as it is used with an inverter 4 as shown in FIG. 1. In this case, both motor operation and generator operation of the electric motor 2 are possible. The electronic control unit 8, together with the energy storage device 9, ensure that only a maximum acceptable electric power is taken out of and reintroduced into the direct current voltage link circuit 12. The embodiments shown in FIGS. 3A, 3B, 3C are used in accordance with the application in question. Electric motors 2 that operate in four-quadrant operation are operated by a circuit as shown in FIG. 3C, whereas electric motors that operate exclusively as motors or exclusively as generators are coupled to a circuit as shown in FIG. 3A or FIG. 3B, respectively. However, a common feature of all of the circuits is that the direct current voltage link circuit 12 is only loaded with the maximum acceptable average electric power so that the dimensions of the direct current voltage link circuit can be correspondingly smaller.

The invention claimed is:

1. A device for controlling electric drives in machinery, the device comprising:
an electronic control unit for calculating, in advance, electric energy required by at least one electric drive as a function of motion profiles of the at least one electric drive; and
an electric energy storage device located between a voltage source and the at least one electric drive, said electric energy storage device and said electronic control unit together taking a substantially constant electric power out of a connected power supply system at least during a period of time, although the at least one electric drive does not have a constant power input during the period of time.

2. The device according to claim 1, wherein said electronic control unit calculates an average electric power demanded by the electric drive over a certain period of time.

3. The device according to claim 1, wherein said electronic control unit calculates an arithmetic mean of power demand of the at least one electric drive as a function of a motion profile to be carried out periodically.

4. The device according to claim 1, which further comprises a converter or inverter for supplying the at least one electric drive with electric power.

5. The device according to claim 4, wherein said converter or inverter is connected between said energy storage device and the at least one electric drive.

6. The device according to claim 1, wherein said electronic control unit is connected to a direct current voltage link circuit.

7. The device according to claim 6, which further comprises a rectifier connected between said direct current voltage link circuit and the voltage source, the voltage source being an alternating current power supply system.

8. The device according to claim 6, which further comprises at least one direct current consumer connected to said direct current voltage link circuit.

9. The device according to claim 1, which further comprises sensors for detecting at least one of a motor current and a motor voltage and supplying at least one of the motor current or the motor voltage to said electronic control unit to calculate an electric energy demand of the at least one motor.

10. The device according to claim 1, wherein a flow of electric energy from said electronic control unit to the at least one electric drive is settable.

11. The device according to claim 1, wherein a flow of energy from the at least one electric drive to said electronic control unit is settable.

12. The device according to claim 1, wherein a flow of energy from said electronic control unit to the at least one electric drive and vice versa is settable.

13. The device according to claim 1, wherein said electronic control unit includes an electronic memory for storing motion profiles of the at least one electric drive.

14. A machine for processing printing material, the machine comprising a device according to claim 1.

15. A machine for processing printing material, comprising:
  a printing press;
  said printing press including:
    an electronic control unit for calculating, in advance, electric energy required by at least one electric drive as a function of motion profiles of the at least one electric drive; and
    an electric energy storage device located between a voltage source and the at least one electric drive, said electric energy storage device and said electronic control unit together taking a substantially constant electric power out of a connected power supply system at least during a period of time, although the at least one electric drive does not have a constant power input during the period of time.

* * * * *